Aug. 14, 1923.
D. R. THROOP
SCRAPER
Filed July 24, 1922
1,464,687
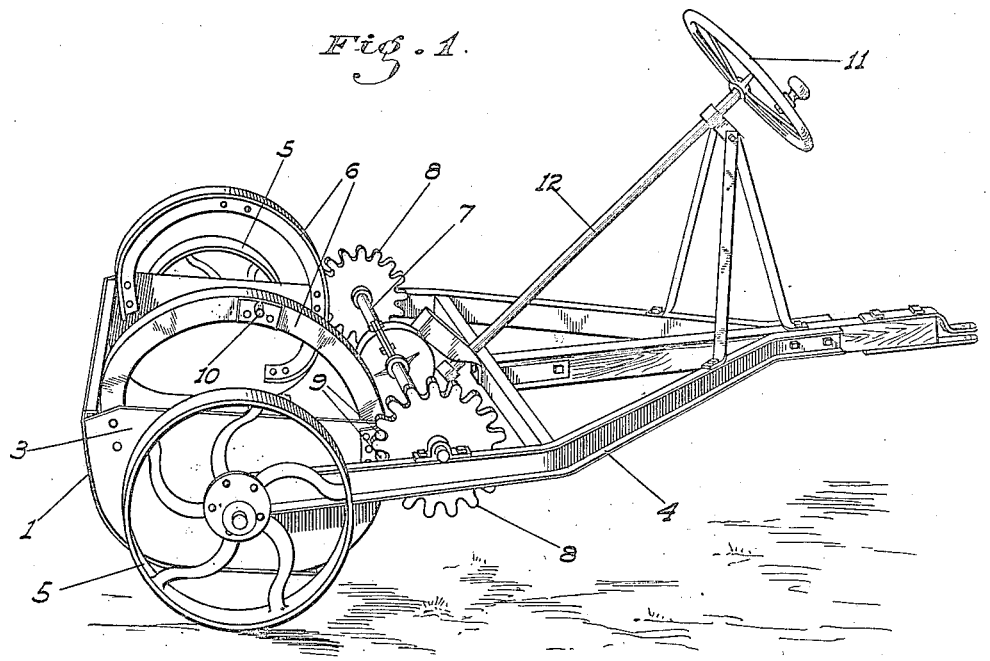
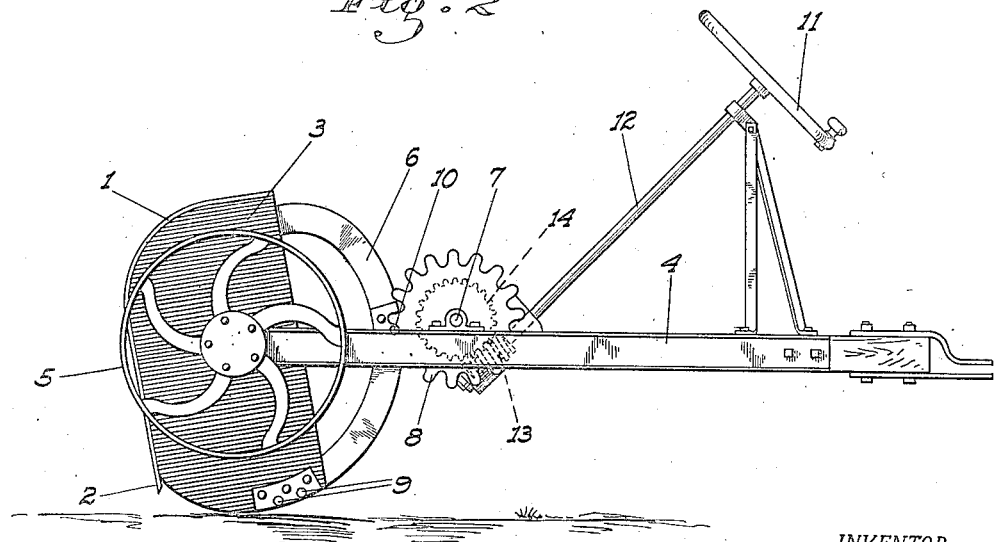
INVENTOR.
Damon R. Throop
BY
ATTORNEY Patented Aug. 14, 1923.

1,464,687

UNITED STATES PATENT OFFICE.

DAMON R. THROOP, OF STOCKTON, CALIFORNIA.

SCRAPER.

Application filed July 24, 1922. Serial No. 577,087.

*To all whom it may concern:*

Be it known that I, DAMON R. THROOP, a citizen of the United States, residing at Stockton, county of San Joaquin, State of California, have invented certain new and useful Improvements in Scrapers; and I do declare the following to be a full, clear and exact description of the same, reference being had to the accompanying drawings, and to the characters of reference marked thereon, which form a part of this application.

This invention relates to improvements in land scraping and spreading devices, and particularly to a scraper of the well-known Fresno type, the principal object of my invention being to provide such a scraper with means for enabling the blade to be set and held in different positions, for allowing the scraper when dumped to be held in various positions or settings for spreading the dirt dumped to various depths; and for enabling the scraped dirt to be transported any desired distance without dragging the scraper bowl along the ground or spilling any of the dirt.

Another object is to thus provide for controlling the movements of the scraper with but very little physical exertion on the part of the operator being necessary.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the scraper, showing the same in a scraping or loading position.

Fig. 2 is a side view of the scraper, showing the same in a spreading position.

Referring now more particularly to the characters of reference on the drawings, the numeral 1 denotes the bowl or scoop of the scraper, of substantially standard form and construction, having the usual cutting or scraping blade 2 at its forward and lower edge, and the dirt retaining side plates 3.

The bowl is pivotally mounted in a frame 4, adapted to be supported at its front end by a pulling device and preferably supported at its rear end by wheels 5, whose axes are common with the pivotal connection of the bowl with the frame. Fixed to the plates 3 and projecting upwardly therebeyond are runners or shoes 6, which for the greater portion of their extent are curved on an arc concentric with the pivotal connection of the bowl with the frame, and of greater radius than the wheels, if these are employed.

A shaft 7 extending transversely of the frame 1 and journaled thereon ahead of the runners has fixed thereon a pair of toothed wheels 8, similar in form to spur gears, which wheels are located in planes just outside the runners 6.

Fixed on and projecting outwardly from each runner on the side thereof are spaced and horizontally disposed pin members 9 and 10, adapted to enmesh with the teeth of the corresponding wheel 8 with certain positions of the bowl.

There are preferably two of the pins 9 on each side, and one pin 10, the former being located to engage the tooth-wheels when the bowl is in a loading position as shown in Fig. 1, and the latter being positioned to engage the wheels 8 when the bowl is in a spreading position, as shown in Fig. 2.

The turning of the shaft 7, and hence the wheels 8, is controlled by a hand wheel 11 mounted on the frame 1, said wheel having a shaft 12 which carries a worm 13 engaging a worm wheel 14 on the shaft 7. In this manner the shaft 7 may be easily turned by turning the hand wheel, but cannot be turned by pressure applied to the wheels 8.

In operation, presume the pins 9 to be engaged with the wheels 8, and it is desired to start scraping operations. To set the blade 2 at the desired cutting depth, the wheels 8 are turned by manipulation of the wheel 11 so as to cause the pins 9 to be forced downwardly, which of course causes the bowl to be swung about its pivotal connection with the frame as an axis, which in turn causes the angle of the blade with respect to the ground to be altered. When the bowl is loaded, and it is desired to dump the load, the wheels 8 are turned in the same direction to throw the pins 9 farther down and out of mesh with the wheel-teeth, and with a continued forward movement of the frame 1, the bowl will automatically upset and ride on the runners 6 in the manner common to this type of scraper.

After the bowl has thus rotated a certain distance, the pins 10 move into engagement with the wheel teeth, preventing further movement of the bowl, and the latter is then held in a spreading position. By then causing the wheels 8 to turn so as to work the pins 10 downwardly, the height of the blade (which is now to the rear of the frame and wheels) from the ground may be increased, to increase the depth to which the load will be spread. Further turning of the wheels 8 moves the pins 10 entirely below and free of the wheels, allowing the bowl to turn still further to dump its load in a single mass. Two of the pins 9, and only one pin 10 are provided on each side because the range of position at which the bowl may be held is preferably greater for loading than for spreading.

If it is desired to transport the load any distance previous to dumping, the wheels 8 are rotated in the opposite direction to that just described, which causes the pins 9 to be raised, and consequently the blade 2 will likewise be raised clear of the ground, the load being thus capable of being transported without dragging it along in contact with the ground.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A scraper comprising a frame, a bowl pivoted therein, said bowl having a scraping edge, a plurality of pins projecting horizontally in fixed relation to the bowl and arranged in an arc concentric with the axis thereof, toothed wheels whose teeth are positioned in the path of movement of said pins, the latter having a spacing equal to that of the teeth and being engaged thereby when the scraping edge is adjacent the ground, and means for rotating the wheels.

2. A scraper comprising a frame, a bowl pivoted therein and tending to upset forwardly with the forward movement of the frame, releasable control means for normally preventing the bowl from upsetting, and means whereby said tendency of the bowl to upset with the forward movement of the frame will aid in the releasing movement of the control means.

3. A scraper comprising a frame, a bowl pivoted therein and adapted to automatically upset with the forward movement of the frame, pins projecting horizontally in fixed relation to the bowl at spaced intervals, toothed wheels whose teeth are positioned in the path of movement of said pins, and means for controlling the rotation of said wheels.

4. A scraper comprising a frame, a bowl pivoted therein and adapted to automatically upset with the forward movement of the frame, pins projecting horizontally in fixed relation to the bowl at spaced intervals, toothed wheels whose teeth are positioned in the path of movement of said pins, manually controlled means for rotating said wheels in either direction, and means whereby the pressure of the pins against the wheel-teeth will not impart rotation to said wheels.

In testimony whereof I affix my signature.

DAMON R. THROOP.